(12) United States Patent
Meyer et al.

(10) Patent No.: US 11,557,040 B2
(45) Date of Patent: Jan. 17, 2023

(54) VISION SYSTEM WITH COLOR SEGMENTATION FOR OPERATOR ENHANCED VIEWING

(71) Applicant: Leoni Kabel GMBH, Nuremberg (DE)

(72) Inventors: Andrew Meyer, Shelby Township, MI (US); Nick Tebeau, Royal Oak, MI (US); James Reed, Lake Orion, MI (US); Andy Reed, Oxford, MI (US); Ryan Fitz-Gerald, Rochester Hills, MI (US)

(73) Assignee: BIZLINK INDUSTRY GERMANY GMBH, Roth (DE)

( * ) Notice: Subject to any disclaimer, the term of this patent is extended or adjusted under 35 U.S.C. 154(b) by 0 days.

(21) Appl. No.: 16/176,732

(22) Filed: Oct. 31, 2018

(65) Prior Publication Data

US 2019/0073773 A1 Mar. 7, 2019

Related U.S. Application Data

(63) Continuation of application No. PCT/US2017/030832, filed on May 3, 2017.

(60) Provisional application No. 62/331,917, filed on May 4, 2016, provisional application No. 62/331,406, filed on May 3, 2016, provisional application No. 62/331,205, filed on May 3, 2016.

(51) Int. Cl.
*G06T 7/00* (2017.01)
*G06T 7/11* (2017.01)
*G06T 7/90* (2017.01)
*G06T 11/00* (2006.01)

(52) U.S. Cl.
CPC .............. *G06T 7/11* (2017.01); *G06T 7/0004* (2013.01); *G06T 7/90* (2017.01); *G06T 11/001* (2013.01); *G06T 2207/10024* (2013.01); *G06T 2207/30164* (2013.01)

(58) Field of Classification Search
CPC . G06T 7/0004; G06T 7/11; G06T 7/90; G06T 11/001; G06T 2207/10024; G06T 2207/30164
See application file for complete search history.

(56) References Cited

U.S. PATENT DOCUMENTS 3,614,640 A * 10/1971 Wolf ........................ H03D 3/28
                                                                        327/47
3,904,957 A *  9/1975 Griese ................ G01N 27/9046
                                                                        324/233

(Continued)

FOREIGN PATENT DOCUMENTS

EP      2801815       11/2014
JP      63153434 A  *  6/1988

OTHER PUBLICATIONS

Borsu et al. ("Robotic Tracking and Marking of Surface Shape Defects on Moving Automotive Panels," Canadian Conference on Computer and Robot Vision; Date of Conference: May 25-27, 2011) (Year: 2011).*

(Continued)

*Primary Examiner* — Yubin Hung
(74) *Attorney, Agent, or Firm* — Mark L. Maki; Miller Canfield

(57) ABSTRACT

An improved method for examining an article by using a vision system is presented. Also presented is a vision system for use within such a method.

6 Claims, 3 Drawing Sheets

(56) References Cited

U.S. PATENT DOCUMENTS

| | | | | |
|---|---|---|---|---|
| 3,988,530 | A * | 10/1976 | Ikegami | G01N 21/89 348/134 |
| 5,386,789 | A * | 2/1995 | Futamura | D05B 19/08 112/102.5 |
| 5,937,104 | A * | 8/1999 | Henderson | H04N 9/75 348/586 |
| 2003/0099393 | A1 * | 5/2003 | Oshiumi | G01N 21/274 382/150 |
| 2004/0165773 | A1 * | 8/2004 | Katsuyama | G06T 7/143 382/173 |
| 2006/0140471 | A1 * | 6/2006 | Murakami | G06T 7/001 382/145 |
| 2009/0295824 | A1 * | 12/2009 | Shirata | G06K 9/00234 345/594 |
| 2010/0266195 | A1 * | 10/2010 | Iwanaga | G06K 9/4652 382/149 |
| 2012/0211679 | A1 * | 8/2012 | Heng | G01N 15/147 250/574 |
| 2012/0321189 | A1 * | 12/2012 | Amir | G06K 9/346 382/177 |
| 2013/0155187 | A1 * | 6/2013 | Skyberg | H04N 5/23238 348/46 |
| 2014/0072195 | A1 * | 3/2014 | Zhang | G06T 7/0012 382/129 |
| 2014/0226900 | A1 | 8/2014 | Saban et al. | |
| 2015/0055859 | A1 * | 2/2015 | Wolk | G06K 9/4671 382/165 |
| 2015/0262022 | A1 * | 9/2015 | Fujikawa | G06K 9/52 382/141 |
| 2016/0018810 | A1 * | 1/2016 | Mori | G05B 19/182 700/166 |
| 2016/0051230 | A1 * | 2/2016 | Yoo | G01S 15/8993 600/440 |
| 2016/0217328 | A1 * | 7/2016 | Yanai | G06K 9/22 |

OTHER PUBLICATIONS

The International Search Report and Written Opinion of the International Searching Authority for PCT/US2017/030832, date completed Aug. 8, 2017, dated Oct. 23, 2017.

The International Preliminary Report on Patentability for PCT/US2017/030832, dated Nov. 6, 2018.

* cited by examiner

VISION SYSTEM WITH COLOR SEGMENTATION FOR OPERATOR ENHANCED VIEWING

CROSS REFERENCE TO RELATED APPLICATIONS

This application claims priority from PCT application PCT/US2017/030832 filed May 3, 2017 pending, which claims priority from provisional application 62/331,205, filed on May 3, 2016, and from provisional application 62/331,406, filed on May 3, 2016, and from provisional application 62/331,917, filed on May 4, 2016, which applications are incorporated herein by reference in their entirety.

FIELD OF THE INVENTION

The invention relates to a method for examining an article by using a vision system. The invention further relates to such a vision system.

BACKGROUND OF THE INVENTION

In various manufacturing and production environments, colors or areas of color might be incorporated into an article or placed on external surfaces of an article. These colors may be present in a particular pattern, such as might be found on a label, or might be different areas of different colors present on the article. The colors may be part of the article, such as a label or color pattern in the article, or may be added to the article wherein different colors may be decorative or identify various characteristics of the article such as the type of an article, size of an article or part, material, shape or the like. In one example, the color may be applied as a paint spot to indicate particular types and sizes of parts.

In such instances, it may be necessary for an individual or operator to monitor the colors or patterns of colors on the articles, such as during manufacturing or production, to ensure manufacturing or production quality, wherein differences in colors or their presence or absence may identify defects in the part or color pattern, improper coloration, errors in a type of part, or any other characteristic of the article which may be represented by the color. For example, the color may be added to an article to indicate that inspection of the part has occurred. Further two or more colors may be present which may indicate different conditions such as one color to indicate a specific characteristic of the article, such as part size, and a second color to indicate or validate that the article has been inspected and the first color has been accurately applied.

During manufacturing or production of colors, an operator may need to continuously monitor the color placement or one or more color areas on each of the articles. The continuous monitoring and identification of different colors might lead to eye fatigue and difficulty in maintaining concentration by the operator. In any application where color is important on a product or article, the operator suffering from eye fatigue or who loses concentration may not notice that the color is the wrong color or is partially wrong.

To reduce difficulties, some manufacturing or production lines may include a vision system which optically monitors the articles and displays the articles on a monitoring screen. Currently, a common offering is a vision system that displays a box or highlighted area around the color section found by the vision system. However, no additional guide towards viewing the color is utilized, such that the operator may still suffer from eye fatigue in attempting to differentiate the objects shown in color from other features, colors or structures also present within the highlighted area.

In view of the foregoing, it is an object of the invention to overcome deficiencies in known vision systems.

The vision system of the present invention preferably comprises integrated visioning components which may comprise an image acquisition camera for obtaining images or videos of each article at a desired location within a manufacturing or production environment. For example, the vision system might be used to validate parts received from a supplier but before such parts are installed in a final end product. To inspect such articles, the camera may obtain or acquire still images of the articles at periodic intervals, or even continuous video images, and may output images of the article for subsequent processing by the vision system. Preferably the vision system also includes a light for illuminating the articles viewed by the camera. Preferably the vision system also includes a processor serving as an image processor such as a personal computer, a programmable logic controller (PLC) or other computerized processing device which receives digital images from the camera through an image infeed, processes the image infeed and the data associated therewith, and feeds a processed image output and output data to a display device, monitor or other operator viewable display screen. During processing, this system preferably removes or reduces all other distracting features of the input image besides the relevant color areas, wherein the relevant colors would be emphasized while the remaining areas of the article are deemphasized on the operator's display so that eye fatigue is less of an issue to the operator.

Accordingly, the inventive parts of this vision system may incorporate image processing software in combination with off the shelf, color machine vision hardware for image acquisition and processing. In one preferred configuration, the vision system can be operated with a Cognex camera or a Matrox smart camera to segment colors for automatic inspection.

The vision system is usable in multiple applications. In one example, inspection of bottles may be required where there is a label with multiple colors with graphics. The present invention makes it much easier to see the colors on the label when they are segmented than it is to see the colors in a complex graphic wherein the relevant colors have not been segregated out of the original images. As such, the inventive image enhancement technique preferably segregates out and displays only a color of interest for an operator, allowing the operator to focus on the color areas of concern rather than the whole image.

In another example, a manufacturer may place paint dots on particular parts such as valve stems for an engine, where it is critical that the correct valve stem is inserted into a particular engine. Due to close similarities in these articles, the only clear way of differentiating valves from other types of valves may be a paint dot that is manually applied with a paint marker to an exposed surface of each part. Different color paint dots may indicate different characteristics of the part such as size or material. Since the paint dot is manually applied and a paint marker may apply a paint dot of varying quality, the paint dots may sometimes be barely visible. The operator may be required to monitor each part for the correct color and then reject any parts having a non-conforming color. As another level of complexity, the parts may also be inspected by another inspector, such as an inspector at the manufacturer or a part supplier, wherein the parts may have a paint dot of a second color confirming that the first colored paint dot was properly applied. For example, the engine valve may be marked with a secondary green dot confirming that the primary paint dot of the first color such as orange or purple has been applied. The vision system of the present invention preferably would automatically segment out the green from any of the other colors present on the part and give an operator an easier, lower eye fatigue, viewing of the top of the valves prior to insertion into an engine and also make it an automatic decision to stop the production line if the wrong color is present on such part.

The vision system also accommodates variations in the quality of paint dots for a particular color. Preferably, the vision system incorporates an initial training step into the process. Initially, color images of a part are captured and used to train surfaces in a given color space that correspond to expected variation in one or more colors of interest. Then, during operation, the system will display acquired images to the operator, filtered such that the image as a whole is in monochromatic grayscale except in locations where the color(s) of interest are present. Alternatively, the background features of the part other than the color areas may be blacked out completely on the display device so that the operator is presented with the color areas only.

The vision system may be operated in different optional configurations. In one configuration, a customer may install and operate the vision system in a non-automated configuration. The operator would view the screen and would be presented with the processed images showing the desired color areas emphasized on the display screen. The operator may then use the screen to help make decisions on whether the part is acceptable and take action to remove the non-conforming part or stop the production line until the incorrect part is removed from the production line. In an automated configuration, the processor of the vision system would make a determination of whether each area of color is acceptable or not, i.e. good or bad, and the processor and associated software may then provide feedback to the manufacturing or production equipment to deal with the non-conforming part. The display screen provides feedback to an operator, such as a visual or audible indicator or both to signal the presence of a non-conforming part.

As such, the vision system of the present invention preferably could remove all other distracting features of the image other than the color areas, so that eye fatigue is less of an issue for the operator.

The invention provides a method for examining an article by using a vision system, wherein the article is marked with a color area to identify particular characteristics of the article. In one embodiment the article has been marked prior to using the method described herein. In another embodiment the article is marked as part of the method described herein. In one embodiment the article is a stem valve. A camera of the vision system obtains images of the article, preferably at a location within a manufacturing or production environment. A processor of the vision system receives the images from the camera through an image infeed. In one embodiment, the processor is a computer or a controller. The processor processes the image infeed. Preferably, the image is processed by analyzing the image with respect to its color components how those color components are arranged or distributed in the image. The processor feeds a processed image output to an input on a display device which includes a display screen. The processor displays the processed image on the screen so that it is viewable by an operator. The processor removes or reduces all distracting features of the infeed image received from the camera other than the color area. Thus, when processing the image, the processor identifies the color area as an area of interest and removes or reduces the remaining parts of the image so as to emphasize or highlight the color area relative to the remaining areas of the image. A particular advantage of the invention is that eye fatigue of the operator is reduced. In particular, the operator can focus on the highlighted color area.

In a preferred embodiment the color area is a paint dot which is repeatedly applied to several articles. In one embodiment the paint dot has been applied prior to using the method described herein. In another embodiment the paint dot is applied as part of the method described herein. Said paint dot is applied with varying quality, in particular because said paint dot is applied manually. The processor is preferably configured to identify color areas of different quality, i.e. of different size or shape or both.

In a preferred embodiment the processor segments and identifies the color area on each article and removes or reduces all distracting features of the image from the camera other than the color areas. Thus, the processor is configured to discriminate the color areas against all other areas. In particular, distracting feature are all features and areas of the image which are not necessary to identify the color area. In particular, the processor segments the colors are by identifying its boundaries, i.e. by identifying its extent or shape or contour or any combination of these.

In a preferred embodiment the processor segments and emphasizes the color area while remaining areas of the article are deemphasized on the display device. Deemphasizing is e.g., achieved by reducing contrast or color depth.

In a preferred embodiment the processor segments out the color area and displays that color area in the appropriate color on the screen and in the shape of the color area. Thus, the color and shape of the color area are in the image are preserved in the processed image and in particular also on the screen. In particular, the processor reproduces a substantially unaltered, preferably an unaltered image of the color area, while the remaining picture is preferably altered to highlight the color area. Preferably, the color area is thus represented as an original image of the color area.

In a preferred embodiment the color area is emphasized and remaining areas of the article, i.e. remaining areas of the image of the article, are deemphasized through a black screen or grayscale image. In other words: the color area is cut out and kept while the remaining areas of the image are simply replaced by black color or are converted to a grayscale version of the image.

In a preferred embodiment the article has a primary color area and to validate that the correct color is used in said primary color area, a secondary color area is applied to confirm that the primary color areas are present and properly applied. In one embodiment the secondary color area has been applied prior to using the method described herein. In another embodiment the secondary color area is applied as part of the method described herein. After identifying the color of the primary color area, a check is performed to verify that the color of the primary area, i.e. the primary color, is the correct primary color for the article, i.e. correctly identifies the particular characteristic to be identified by the color in question. In particular, a paint dot of a further color is applied to the article as a secondary color area. Preferably, the primary color is picked from a first set of colors and the color for the secondary color area, i.e. the secondary color, is picked from a second set of colors, while no color of one set is part of the other, i.e. the two color sets are disjunctive.

In a preferred embodiment the article is pre-inspected to ensure that each article properly has a primary color area and to validate that the correct color is used in said primary color area. As a result of the pre-inspection the second color area is applied to the article indicating whether the correct primary color has previously been applied. In one embodiment, the article is preinspected as part of the method described above. In another embodiment, the article is inspected separately.

In a preferred embodiment the secondary color area on different articles is located at different locations relative to the primary color area. In particular, the secondary color area is applied manually.

In a preferred embodiment the vision system automatically segments out and identifies the secondary color present on the article. The processor generates two separate processed images on the screen, wherein a first section of the screen displays the primary color area and a second section of the screen displays the secondary color area. Thus, the processor identifies both color areas on a single article and displays them separately. In one embodiment, the screen is split in half, one half displaying the primary color area, the other half displaying the secondary color area.

In a preferred embodiment the primary and secondary color areas are each displayed with a color area on a black screen or on a grayscale image of the article, wherein the respective color area is emphasized and the remaining areas deemphasized through a black screen or grayscale image. In particular, the processing and displaying of the color area mentioned above in general is applied to both the primary color area and the secondary color area individually.

In general, if a primary or secondary color area or both cannot be identified, the result will be a processed image without the respective area, in particular a completely grayscale or black image.

In a preferred embodiment the vision system differentiates shades of the color to address inconsistencies in the application of such a color to the article. The vision system processes the camera images and identifies each color and plots each color and shade thereof on a color-coordinate system, in particular a three-coordinate system, e.g. an XYZ-system. The coordinates preferably correspond to values of a color scheme or color-space system such as RGB. The processor 17 processes these data points and establishes a volume of space around a desired target color that represents shades of that target color that are acceptable. The vision system identifies the color of the color area and determines its coordinates in the color-coordinate system. A specific color is then assigned a certain space or volume in the color-coordinate system. All colors inside this space are then identified as being different shades of the same color, hence belonging to the same color. The space is in particular defined by an interval for each of the coordinates of the color-coordinate system, i.e. three intervals in case of a three-coordinate system.

In a preferred embodiment the processor is programmed with a range of suitable shades of the target color, which is the tolerance of the system to variations in the target color. In other words: the color of the color area might be applied or identified within a certain range of colors and this range of colors the processor is programmed to recognize, i.e. identify all colors in said range to be a single color, i.e. the target color. Thus the target color might be blue and a range of suitable colors might range from light blue to dark blue or corresponding values in a color-coordinate system. Then the processor will identify all colors from light blue to dark blue as blue, hence as target color.

In a preferred embodiment the processor enhances a color shade that is within the range of suitable shades, so that it is modified and displayed in the target color. Thus, the processor does not merely recognize a color to be inside the range of suitable shades of a target color but also alters its representation on the screen to be exactly that target color. In above mentioned example then, light blue being identified as a shade of the target color blue is not shown as light blue on the screen but as blue. This further simplifies analysis by the operator, since he or she does no longer need to identify various shades. This is now done by the processor.

In a preferred embodiment the vision system is initially calibrated for the primary color that is considered to be conforming. The vision system is calibrated in particular to a secondary color that is considered to be conforming. An image of a master part is acquired by the camera so that the processor determines the data for the target color or colors in particular as plotted in the color-coordinate system, i.e. on a 3D graph. The processor stores the data associated with such plots for future processing of acquired images of actual articles. In effect, all color areas are then compared to the color area or areas of the master article. Various master articles with different colors for a color area are used in one embodiment to calibrate for similar articles being marked with different color areas to identify particular characteristics. Alternatively or in addition various master articles are used in one embodiment, to determine size and shape of a space of a specific color in the color-coordinate system.

In a preferred embodiment the images are acquired in an image acquisition zone and the vision system includes a light which directs light to the image acquisition zone for illuminating each article being viewed by the camera. This advantageously provides uniform light conditions to the image acquisition zone. In one embodiment the light is an LED.

In a preferred embodiment the vision system, in particular display screen, provides feedback, in particular to the operator, and signals the presence of a non-conforming article by means of a visual or audible indicator or both.

In a preferred embodiment an automated configuration is provided. Above remarks concerning a system and method apply to an automated configuration accordingly. The article is marked with a color area to identify particular characteristics of the article. A camera of the vision system obtains images of the article, preferably at a location within a manufacturing or production environment. A processor of the vision system receives the images from the camera through an image infeed. The processor processes the image infeed. The processor of the vision system makes a determination of whether each area of color is acceptable or not by comparing the acquired images and color areas with target colors that have been calibrated earlier. The processor provides feedback to a manufacturing or production equipment to deal with a non-conforming article. Such manufacturing or production equipment is e.g. a handling system or robot arm which removes the non-conforming article from the manufacturing or production line. A screen as described above is present in one embodiment to allow an operator to follow the automated examination process.

A preferred vision system is used within a method as explained above. The vision system comprises a processor and a camera for obtaining images of an article, preferably at a location within a manufacturing or production environment. The article is marked, i.e. has been marked already or is marked as part of the method, with a color area to identify particular characteristics of the article. Said processor is configured to receive the images from the camera through an image infeed, to process the image infeed, to feed a processed image output to an input on a display device which includes a display screen, to display the processed image on the screen so that it is viewable by an operator and to remove or reduce all distracting features of the infeed image received from the camera other than the color area, for reducing eye fatigue of the operator.

Another preferred vision system is for use within a method in an automated configuration as mentioned above. The vision system comprises a processor and a camera for obtaining images of an article, preferably at a location within a manufacturing or production environment. The article is marked with a color area to identify particular characteristics of the article. Said processor is configured to receive the images from the camera through an image infeed, to process the image infeed, to make a determination of whether each area of color is acceptable or not by comparing the acquired images and color areas with target colors that have been calibrated earlier, to provide feedback to a manufacturing or production equipment to deal with a non-conforming article.

The statements made above with respect to a specific method or a specific vision system correspondingly apply to all other methods and visions systems also described herein. Specifically, any feature mentioned with respect to a method or a vision system can be combined with other methods and vision systems described herein.

Other objects and purposes of the invention, and variations thereof, will be apparent upon reading the following specification and inspecting the accompanying drawings.

Figure 1:
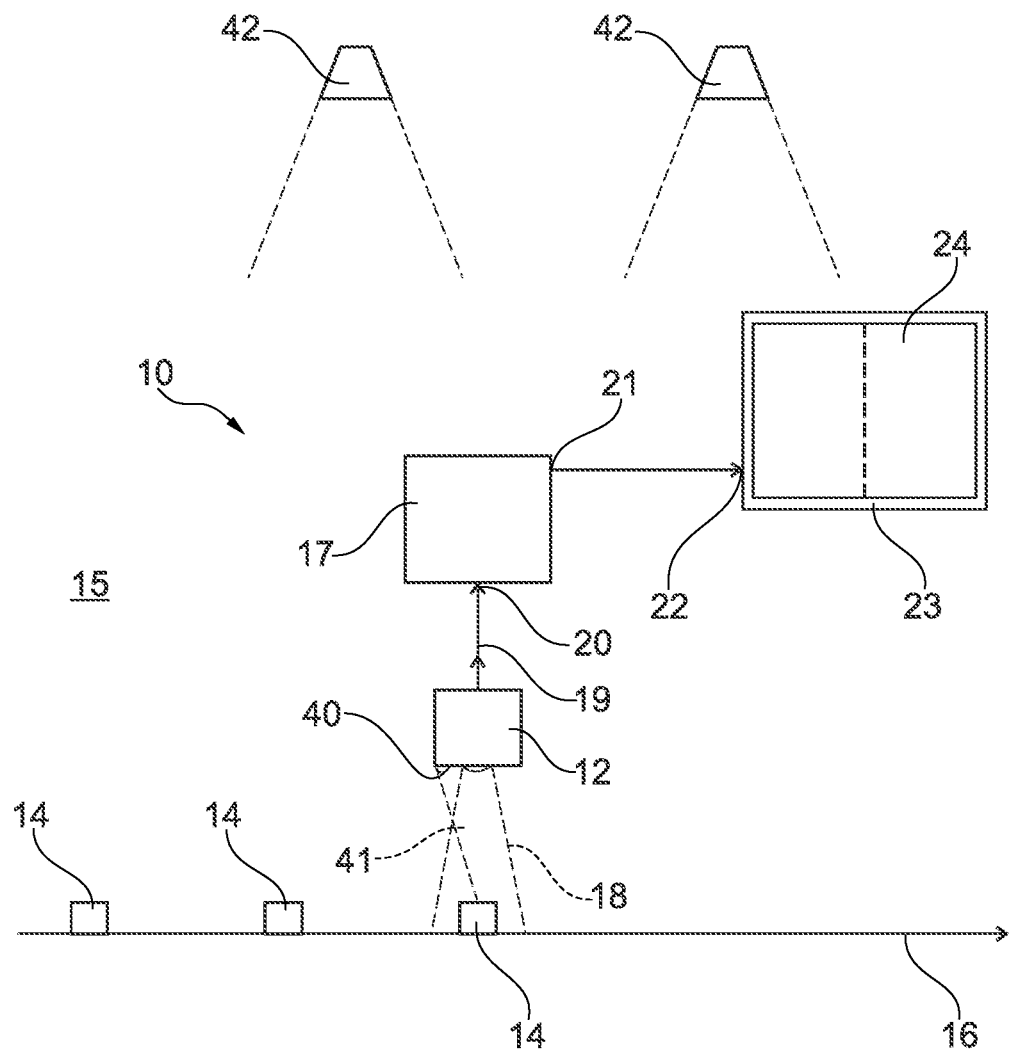
FIG. 1 is a diagrammatic view of the vision system of the present invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, the invention relates to a vision system 10 preferably comprising integrated visioning components which may comprise an image acquisition camera 12 for obtaining images or videos of each article 14 at any selected location within a manufacturing or production environment 15. The camera 12 may obtain or acquire still or video images of the articles 14 as they move through the manufacturing or production environment 15. For purposes of illustration, multiple articles 14 might move along a supply path 16 such as a conveyor belt which feeds the articles 14 to another area, such as an assembly, packaging or shipping area. Alternatively, the articles 14 might be fed one at a time to the area of the camera 12 wherein the invention is not limited to a particular method of supplying the articles 14 to the camera 12.

The vision system 10 also includes a processor 17 serving as an image processor such as a personal computer, a programmable logic controller (PLC) or other computerized processing device. The camera 12 has a lens or other image acquisition component which detects colors on the article 14 so as to monitor an image acquisition area 18 which is diagrammatically shown in FIG. 1. When the article 14 is present within the image acquisition area 18, the camera 12 detects the color of the article 12 and acquires a color image, and preferably a digital image of the article 14. The camera 12 in turn supplies the images or the data associated with the image through a camera output 19 to a corresponding input 20 on the processor 17.

The processor 17 therefore receives digital images from the camera 12 through an image infeed, processes the image infeed and the data associated therewith, and feeds a processed image output and associated output data through a processor output 21 to a corresponding input 22 on a display device, monitor or other operator viewable device 23 which includes a display screen 24. Preferably, the processed image is then displayed on the screen 23 so that it is viewable by an operator.

Generally, during processing, this vision system 10 preferably would remove or reduce all other distracting features of the infeed image received from the camera 12 other than the relevant color areas, wherein the relevant colors would be emphasized while remaining areas of the article are deemphasized on the operator display screen 23 so that eye fatigue is less of an issue to the operator.

Figure 2:
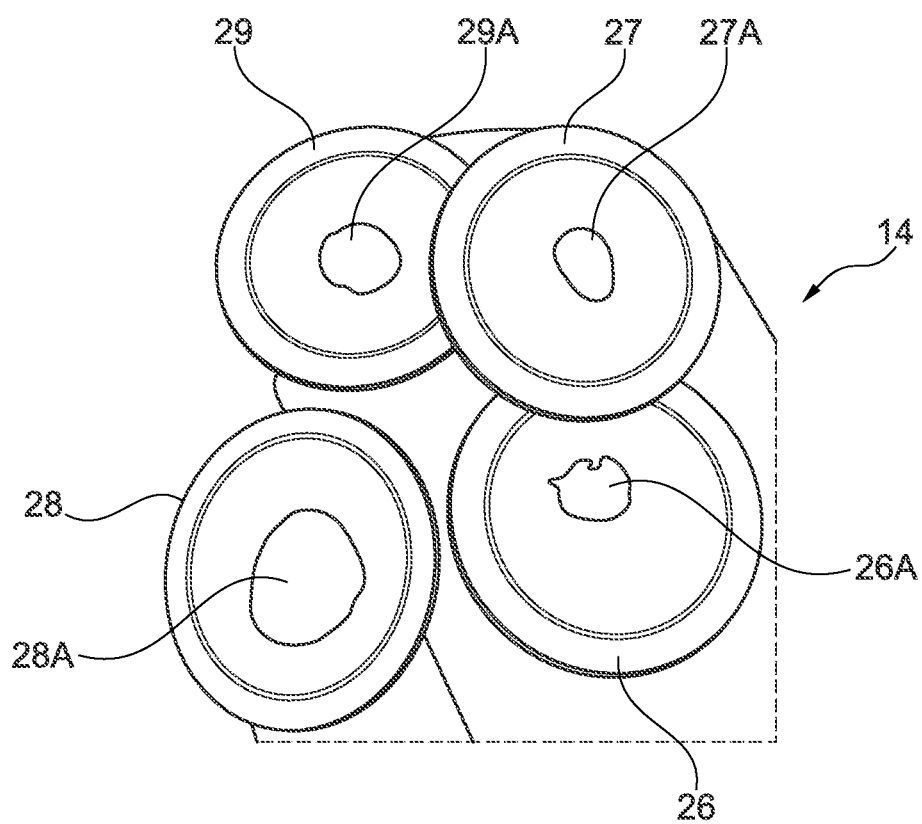
FIG. 2 shows one example of parts and applied color areas.

In more detail as to the present invention, FIG. 2 illustrates exemplary articles 14 which are shown as parts 26-29. These parts 26-29 may be valve stems such as those previously described herein. Each of the parts is marked with a particular color area 26A-29A that has been applied to the parts 26-29, such as by a paint marker, to identify particular characteristics of the parts, such as size, type or material. These color areas 26A-29A are of a different color and distinguishable from the remaining surface areas of the parts 26-29. In this illustrated application, a manufacturer or a supplier to the manufacturer may place color areas 26A-29A, such as paint dots, on the particular part 26-29. This may be desirable when the part is a valve stem for an engine, where it is critical that the correct valve stem is inserted into a particular engine. For example, parts 26 and 27 are both part and marked with the same color in the color areas 26A and 27A. This color might be yellow or might be in a range that would be considered "yellow" by the naked eye. The other parts 28 and 29 may differ from parts 26 and 27 and be marked with a different color in the color areas 28A and 29A such as purple or what might be in a range that would be considered "purple" by the naked eye.

Since the paint dot is manually applied and a paint marker may apply a paint dot of varying quality, the paint dots may sometimes be barely visible, in particular to the naked eye. In FIG. 2, for example, the color area 26A has a darker, more obvious coloration, in comparison to color area 27A which is lighter. In color area 27A, the color material, which can be a paint, may be thin and allow some of the surface color from the part 27 to be visible or show through, which changes the shade of the specific color used in color areas 26A and 27A. Similarly, the second color in color area 29A is darker and more obvious, than the same second color applied to color area 28A, which is lighter. Here again, two shades of the second color are present in the color areas 28A and 29A, i.e. dark purple and light purple. Therefore, the present invention is used to segregate and differentiate first and second colors such as is present in the first color areas 26A and 27A and the second color areas 28A and 29A, while also segregating and differentiating different shades of the first and second colors as will be described further below. As an example, the first color of parts 26A and 27A may be suitable and properly conforming, but if the vision system 10 or operator identify the presence of parts 28 or 29 by seeing the second color areas 28A and 29A, then these 28 or 29 would be considered non-conforming and the system 10 would respond to deal with the non-conforming parts 28 or 29.

Figure 3:
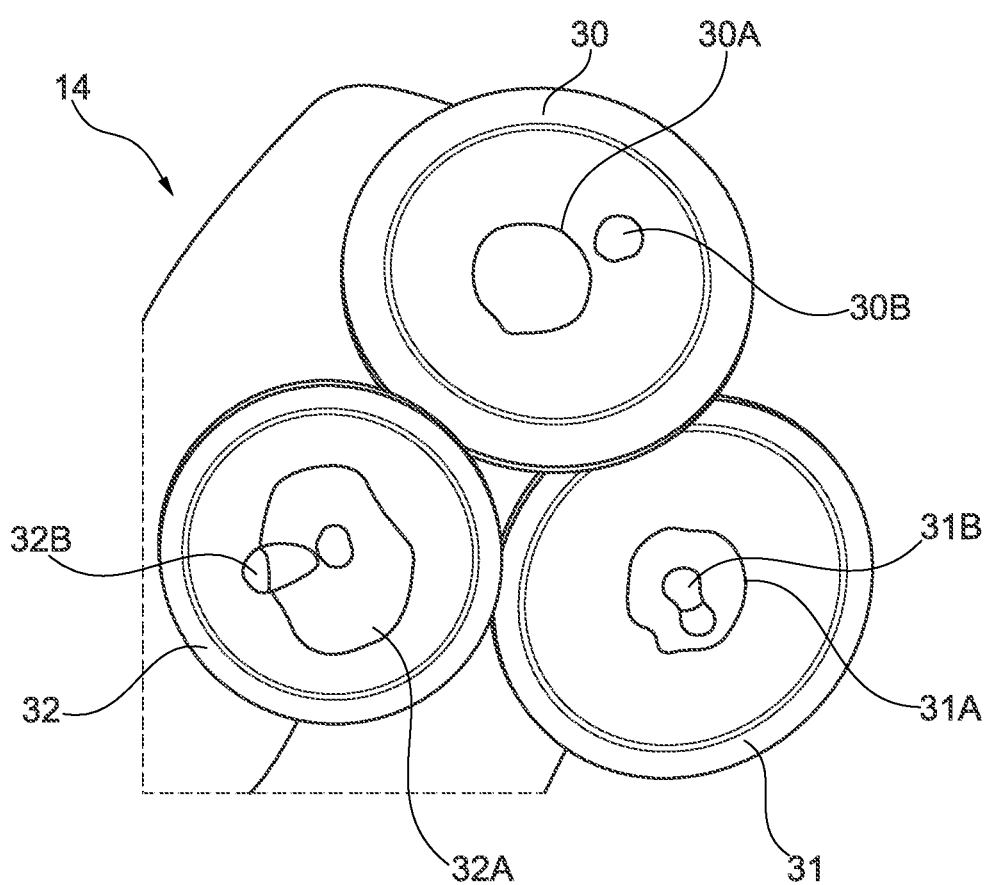
FIG. 3 shows a second example of parts and applied color areas.

Additionally, the vision system 10 may differentiate, segregate and display more than one relevant color per part 14. In the prior example, the operator may be required to monitor each part 14, such as parts 26 and 27, for the correct color and then reject any parts having a non-conforming color, such as parts 28 and 29. As another level of complexity as illustrated in FIG. 3, the parts 14 are designated as parts 30-32, and again may be similar types of parts like valve stems. The parts 30 and 31 are both the same type of valve stem and therefore marked with color areas 30A and 31A with a first common color such as red or what might be considered "red" by the naked eye. The part 32 differs and therefore is marked with a color area 32A that is a second color such as blue or what might be considered "blue" by the naked eye. This marking protocol is similar to the first example above in FIG. 2.

For this second example of FIG. 3, the parts 30-32 are also pre-inspected to ensure that each part 30-32 properly has a primary color area such as color areas 30A-32A. If these color areas are not present, then the part is non-conforming since it is not possible to tell what type of part is being used. This pre-inspection also validates that the correct color is used in color areas 30A-32A. This preliminary inspection may be performed by another inspector, such as an inspector elsewhere at the manufacturer or at a part supplier. If the part 30-32 is properly marked with the primary color area 30A-32A, then a secondary color area 30B-32B is applied, wherein the parts receive a paint dot of a further color, such as green, confirming that the primary color areas 30A-32A are present and properly applied. The secondary color area is applied after the first color areas 30A-32A to validate the parts 30-32, and can be located at different locations on the part 30-32. In FIG. 3, secondary color area 30B is separated from primary color area 30A, color area 31B overlies color area 31A, and color area 32B partially overlies or overlaps color area 32A. The vision system 10 of the present invention preferably would automatically segment out and identify the secondary color, such as green, from any of the other colors present on the part and give an operator an easier, lower eye fatigue, viewing of the top of the parts 30-32 prior to use. In these examples, the inventive image enhancement technique preferably segregates out and displays only one or more colors of interest for an operator, allowing the operator to focus on the color areas of concern rather than the whole image.

In more detail as to FIG. 1 and the operation of the vision system 10, the camera 12 monitors and acquires images from the image acquisition zone 18. The camera 12 may acquire images at periodic intervals, or even continuous video images and would then output images of the article 14 for subsequent processing by the vision system 10. Preferably the vision system would also include a light 40 which would direct light 41 to the image acquisition zone 18 for illuminating each article 14 being viewed by the camera 12. This light 40 provides more uniform light conditions to image acquisition zone 18. In this regard, the environment 15 typically includes ambient lights 42 which illuminate the environment. Since each environment 15 may differ in illumination, the addition of the system lighting 40 provides a more consistent visual environment for acquiring images of the articles 14. Preferably, the light 40 is an LED light although other light sources can be used. Preferably, the vision system 10 with the light 40 is also calibrated to take into account the different characteristics and color variations of each light type.

The processor 17 then receives digital images from the camera 12 through an image in-feed 20 and processes the image infeed and the data associated therewith to detect the color areas present on the articles 14 such as the color areas described relative to FIGS. 2 and 3. The processor 17 then segments and identifies the color area on each part 14. In one preferred embodiment, the processor 17 may then feed a processed image output and output data to the screen 23 on the display device 24. During processing, the processor 17 preferably would remove or reduce all other distracting features of the infeed image from the camera 12 other than the relevant color areas. In other words, the processor 17 would segment and emphasize the relevant colors while remaining areas of the article are deemphasized on the operator display 23 so that eye fatigue is less of an issue to the operator.

In the example of FIG. 2, the processor 17 would segment out the conforming color area 26A on the part 26 and in one configuration would display the color area 26A in the appropriate color, such as yellow, on the screen 23 in the shape of the color area 26A. As seen in FIG. 2, the color areas 26A and 27A have different shapes or boundaries and when shown on the screen 23, the shapes would be displayed in the appropriate color yellow. If a non-conforming part 28 was present, the color area 28A would be displayed in the respective color such as "purple". The operator would be seeing a readily apparent "yellow" area for conforming parts 26 or 27, but if the color area 28A showed in purple, the operator could easily determine that this was the wrong color and the part 28 or 29 was non-conforming. The operator would then initiate an established process to remove the non-conforming part, or, alternatively, the operator's equipment would respond to that non-conforming color and act to remove the non-conforming part.

In this configuration, the processor 17 might only show the color area, and then black out all remaining features and colors of the part so that an operator might see a "yellow" color area on a black screen. Alternatively, the processor 17 could convert all remaining features and colors into a grayscale and show a "yellow" color area with a grayscale image of the part. As such, the primary and secondary color areas may be displayed with color area on a black screen or on a grayscale image of the part, wherein the color area is emphasized and the remaining areas of the part 14 deemphasized through a black screen or grayscale image.

Where primary and secondary colors are used as in FIG. 3, the processor may generate two separate processed images on the screen 23. The processed images could be displayed in a split screen format. For example, the left side of the screen 23 might display the primary color area 30A or 31A in red so that the operator can easily confirm that the part is conforming. If the color area 32B is displayed in blue, the operator could determine that a non-conforming part 32 is present. On the right side of the screen 23, the processor 17 may generate a processed image showing the secondary color area 30B-32B. If the secondary color such as green is seen, the operator knows that the part has been inspected and validated as including the primary color area and this is accurate. If the secondary color area is not present, the primary color area might still be present but the operator would know that the primary color area was not pre-inspected and approved as accurate and the part may still be rejected as non-conforming since it was not validated previously. Here again, the primary and secondary color areas may be displayed with color area on a black screen or on a grayscale image of the part, wherein the color area is emphasized and the remaining areas deemphasized through a black screen or grayscale image.

The vision system 10 also differentiates shades of the colors to address inconsistencies in the application of such colors to the articles 14. The vision system processes the camera images and identifies each color and plots each color and shade thereof on an XYZ coordinate system. In this system, the primary RGB colors correspond to and are plotted on the respective XYZ axes such that each color can be plotted in space with XYZ coordinates. While the vision system 10 works with an RGB space, any color space supported by the underlying hardware may be used such as CIELAB and IISL. The processor 17 processes these data points, and establishes a volume of space around a desired target color that represents shades of that target color that are acceptable. For example, if a certain shade of yellow is the color being applied to a color area, the actual shade of yellow visible on the part 14 may vary due to differences in thickness of color or heaviness of the color being applied or other factors. The processor 17 is therefore programmed with a range of suitable shades of the target color, which is the tolerance of the system 10 to variations in the target color.

When certain shades of the target color are found to be suitable, the processor 17 can either display on the display 24 the color area in the actual shade acquired by the camera 12, or can enhance the accepted color shade so that it is modified and displayed in the target color. As such, the operator can either see the color area in the true color or an enhanced color.

As an initial step of the process, the vision system 10 can be calibrated so as to train the system 10 for the primary and secondary colors that are considered to be conforming. In this regard, a master part 14 may initially be desired that includes the primary or secondary colors or both present in the preferred target color. An image of the master part 14 can be acquired by the camera 12 so that the processor 17 can determine the data for the target color(s) as plotted on the 3D graph, and then store the data associated with such plot(s) for future processing of acquired images of actual parts 14. Since the camera 12 preferably includes the light 40, this will minimize the effects of variations in ambient lighting from lights 42, and the illumination provided to the image acquisition zone 18 will be more uniform and consistent. Alternatively, the processor 17 could be pre-calibrated with color charts with which the target colors can be plotted.

Preferably, the light 40 is an LED light although other light sources can be used. Preferably, the light 40 is also calibrated to take into account the different characteristics and color variations of each light type.

Accordingly, the inventive parts of this vision system may incorporate image processing software in combination with off the shelf, color machine vision hardware for image acquisition and processing. In one preferred configuration, the vision system 10 can be operated with a Cognex camera or a Matrox smart camera to segment colors for automatic inspection.

The vision system may be operated in different optional configurations. In one configuration, a customer may install and operate the vision system in the non-automated configuration wherein the operator continuously monitors the display 24 according to the above description. The operator would view the screen 23 and would be presented with the processed images showing the desired color areas emphasized on the display screen with either color areas on black background, or on a grayscale image of the part 14. The operator may then use the screen 23 to help make decisions on whether the part 14 is acceptable and confirming and if not conforming, the operator can take action to remove the non-conforming part 14 or stop the production line until the incorrect part is removed from the production line.

In an automated configuration, the processor 17 of the vision system 10 would make a determination of whether each area of color is acceptable or not, i.e. good or bad, by comparing the acquired images and color areas with target colors that have been calibrated earlier such as during the teaching step described above. The processor 17 and associated software may then provide feedback to the manufacturing or production equipment to deal with the non-conforming part without requiring the intervention of the operator. The display screen 23 may still provide feedback to an operator, such as a visual or audible indicator or both to signal the presence of a non-conforming part 14, but the processor 17 may automatically take steps to address the non-conforming part 14, or may take such automatic steps after inviting the operator to authorize such intervention by the vision system 10.

As such, the vision system 10 of the present invention preferably can serve to remove all other distracting features of the image other than the color areas, so that eye fatigue is less of an issue for the operator.

The invention claimed is:

1. Method for examining an article by using a vision system, wherein
    the article is marked by applying a color area onto the article to identify particular characteristics of the article indicated by a primary color defining the color area,
    a camera of the vision system obtains images of the article including the color area,
    a processor of the vision system receives the images from the camera through an image infeed,
    the processor processes the image infeed to identify the color area and generate a processed image containing the color area,
    the processor feeds said processed image to an input on a display device which includes a display screen,
    the processor displays the processed image on the screen with the color area displayed in the primary color or a shade thereof so that it is viewable by the operator for visual identification by the operator, and
    during said processing of the image infeed, the processor removes or reduces all distracting features of the infeed image received from the camera other than the color area to generate the processed image, wherein the processed image emphasizes the color area in comparison to the distracting features to assist the operator in identifying the particular characteristics of the article indicated by the primary color for reducing eye fatigue of the operator, wherein
    the article has a primary color area defined by said color area, and to validate that the correct color is used in said primary color area,
    a secondary color area is applied to the article to confirm that the primary color area is present and properly applied.

2. Method according to claim 1, wherein the article is pre-inspected to ensure that each article properly has a primary color area and to validate that the correct color is used in said primary color area.

3. Method according to any one of claims 1 to 2, wherein the secondary color area on different articles is located at different locations relative to the primary color area.

4. Method according to claim 1, wherein
- the vision system automatically segments out and identifies the secondary color area present on the article,
- the processor generates two separate processed images on the screen, wherein a first section of the screen displays the primary color area and a second section of the screen displays the secondary color area.

5. Method according to claim 1, wherein the primary and secondary color areas are each displayed on the screen with any remaining areas of the image shown as a black screen or as a grayscale image of the article to deemphasize the distracting features in the remaining areas, wherein the respective primary and secondary color areas are emphasized and the remaining areas deemphasized through the black screen or the grayscale image.

6. Method according to claim 1, wherein
- the vision system is initially calibrated for the primary color that is considered to be conforming,
- the vision system is calibrated in particular to a secondary color defining the secondary color area that is considered to be conforming,
- an image of a master part is acquired by the camera so that the processor determines the data for the target color or colors and stores the data associated with said target color or colors for future processing of acquired images of actual articles.

* * * * *